United States Patent
Clabes et al.

(10) Patent No.: US 6,934,658 B2
(45) Date of Patent: Aug. 23, 2005

(54) COMPUTER CHIP HEAT RESPONSIVE METHOD AND APPARATUS

(75) Inventors: Joachim Gerhard Clabes, Austin, TX (US); Lawrence Joseph Powell, Jr., Round Rock, TX (US); Daniel Lawrence Stasiak, Rochester, MN (US); Michael Fan Wang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/401,410

(22) Filed: Mar. 27, 2003

(65) Prior Publication Data
US 2004/0193383 A1 Sep. 30, 2004

(51) Int. Cl.[7] ............... G01K 1/08; G01K 17/00; H01L 31/00
(52) U.S. Cl. ............... 702/132; 702/136; 257/457
(58) Field of Search ............... 702/132, 136; 257/467

(56) References Cited

U.S. PATENT DOCUMENTS 5,994,752 A * 11/1999 Sander et al. ............... 257/467
6,308,311 B1 * 10/2001 Carmichael et al. ............... 716/16
6,442,735 B1 * 8/2002 Joshi et al. ............... 716/4
2002/0173928 A1 * 11/2002 Willner et al. ............... 702/127

* cited by examiner

Primary Examiner—John Barlow
Assistant Examiner—Meagan S Walling
(74) Attorney, Agent, or Firm—Carr LLP; Diana R. Gerhardt

(57) ABSTRACT

Disclosed is an apparatus incorporating hardware based logic and a predetermined default list of software affecting responses to be taken in connection with temperatures sensed by thermal sensors checking the temperature of portions of computer logic. At the time application software is loaded, the software can modify the default response list. The list of responses to be taken and the over temperature conditions at which they are to be activated are stored in hardware directly accessible by hardware based thermal sensor monitoring logic for direct control of the hardware. The control can alter conditions such as clock frequency, stopping use of application software, interrupting OS functionality, removing power from components and so forth.

13 Claims, 3 Drawing Sheets

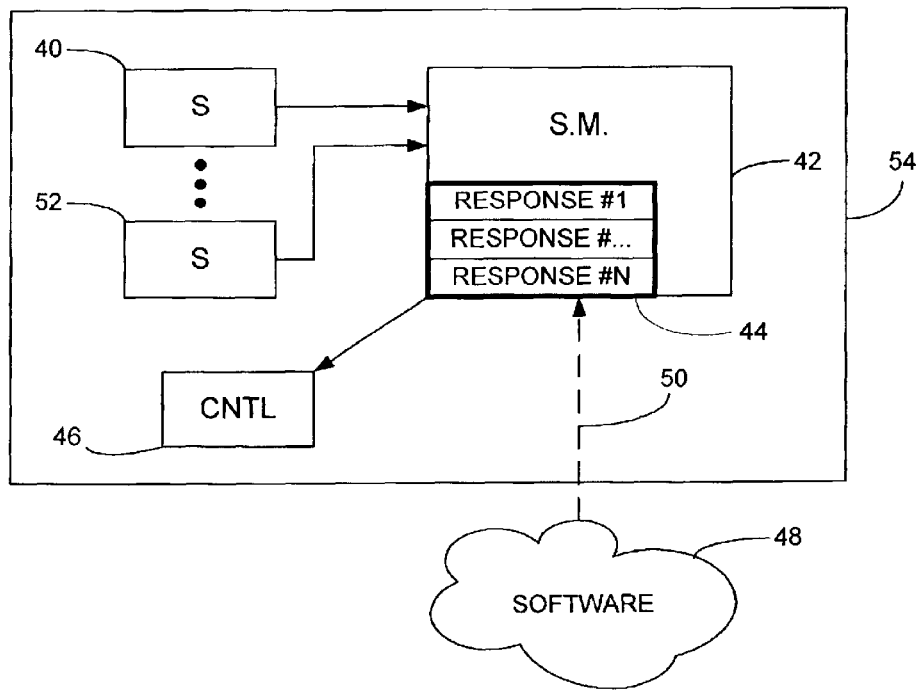
FIG.3
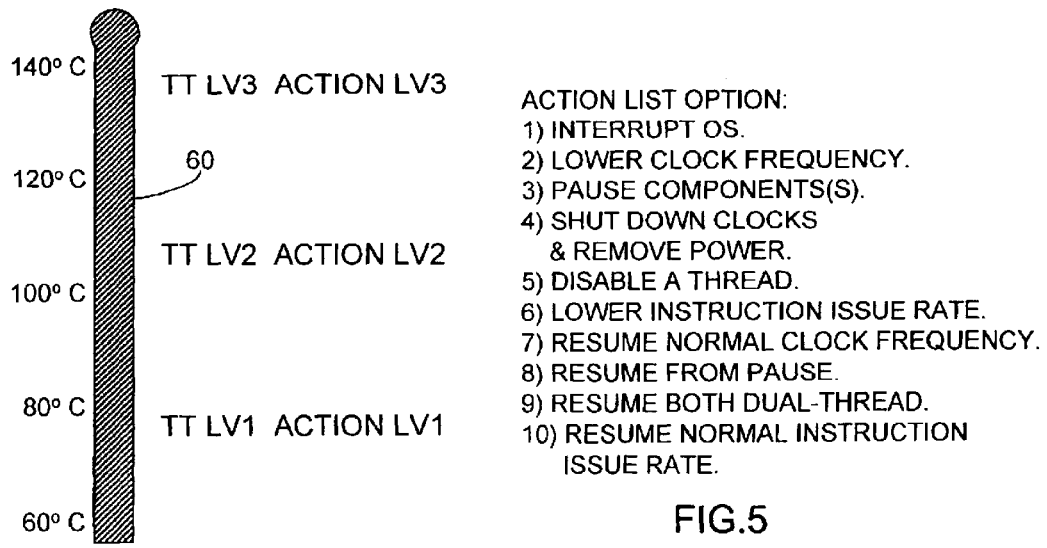
FIG.4
ACTION LIST OPTION:
1) INTERRUPT OS.
2) LOWER CLOCK FREQUENCY.
3) PAUSE COMPONENTS(S).
4) SHUT DOWN CLOCKS & REMOVE POWER.
5) DISABLE A THREAD.
6) LOWER INSTRUCTION ISSUE RATE.
7) RESUME NORMAL CLOCK FREQUENCY.
8) RESUME FROM PAUSE.
9) RESUME BOTH DUAL-THREAD.
10) RESUME NORMAL INSTRUCTION ISSUE RATE.
FIG.5

COMPUTER CHIP HEAT RESPONSIVE METHOD AND APPARATUS

TECHNICAL FIELD

The invention relates to a PU (processing unit) control and, more particularly, to a method of controlling chip temperature in an operating PU.

BACKGROUND

When a program is running in a CPU (Central Processing Unit) or other PU, local hot spots can develop on an integrated circuit chip. Present day chips are configured with islands of circuitry where different islands perform different functions in the PU operation. On a multiprocessor chip, each island may be a separate PU. In either event, each island is likely to experience different workloads and thus reach different "hot spot" temperatures. Known prior art responses comprise shutting down all processing operations of the processor until the chip is adequately cool, decreasing operational workload in a standardized manner for all software used on the PU or increasing the cooling air flow used to lower the temperature of the chip.

It would be desirable if a method could be devised whereby the PU could be allowed to continue to operate, but the hot spot islands of the PU would be substantially immediately required to run at a reduced capacity while the hot spot cools. It would be further desirable to reduce the load on the hot spot island as a function of the amount of overheating of the island in question.

SUMMARY OF THE INVENTION

The present invention comprises a software modifiable list of over temperature responses in hardware for direct action access by hardware based monitoring circuitry.

BRIEF DESCRIPTION OF THE DRAWINGS

For a more complete understanding of the present invention, and its advantages, reference will now be made in the following Detailed Description to the accompanying drawings, in which:

FIG. 3 is a block diagram showing the main components involved in providing overheat responsive actions in the present invention;

FIG. 4 is a temperature graph with indicated reactions at various indicated temperatures;

FIG. 5 is a list of possible actions that could be used in connection with FIGS. 3 and 4;

DETAILED DESCRIPTION

In the remainder of this description, a processing unit (PU) may be a sole processor of computations in a device. In such a situation, the PU is typically referred to as a CPU (central processing unit). The invention, however, may also be readily practiced on a multiprocessor chip. While the explanation following is directed to sensing a single hot spot of an integrated circuit chip, the invention as practiced will typically have a multiplicity of sensors, each monitoring the temperature of different logic circuits, only some of which may overheat for certain types of computer program operations. As an example, if a program entailed the computation of an extremely large number of consecutively occurring floating point arithmetic operations, the floating point arithmetic logic circuit portion might overheat without causing any other portions to overheat. It should further be noted that the explanation of operation is provided for a single PU controlling operations as concerns only thermal sensors monitoring logic of that PU. Similar logic would be used in a multiprocessor situation where thermal units measuring the temperature of circuitry of multiple PUs are all controlled by a single piece of hardware-based monitoring logic.

Figure 1:
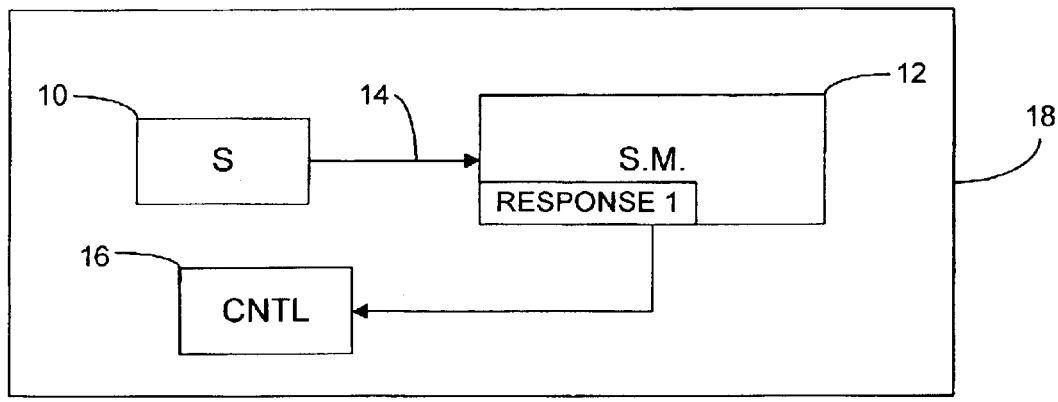
FIG. 1 is a block diagram of essential parts of a prior art chip overheating control circuit.

In FIG. 1, a block 10 represents a thermal sensor circuit on an integrated chip and a block 12 represents a thermal sensor monitoring logic circuit directly connected to the sensor circuit 10 by a lead 14. A control block 16 is directly connected to the monitoring logic block 12 to provide a prescribed action when an overheat condition is sensed. The enclosing line 18 illustrates that all the components shown are hardware. Within block 12 is a response 1 that is timely activated, although in an identical manner for all types of programs and situations. Such a process would not take into account the fact that some programs operate completely differently and use different resources than others. One resource might be the floating point arithmetic logic mentioned above. Some programs might have multiple threads to enable simultaneous actions from parallel operating PUs on a single multiprocessor chip. The most desirable response action in such a program would be completely different than a program which was run entirely on a single computer.

Figure 2:
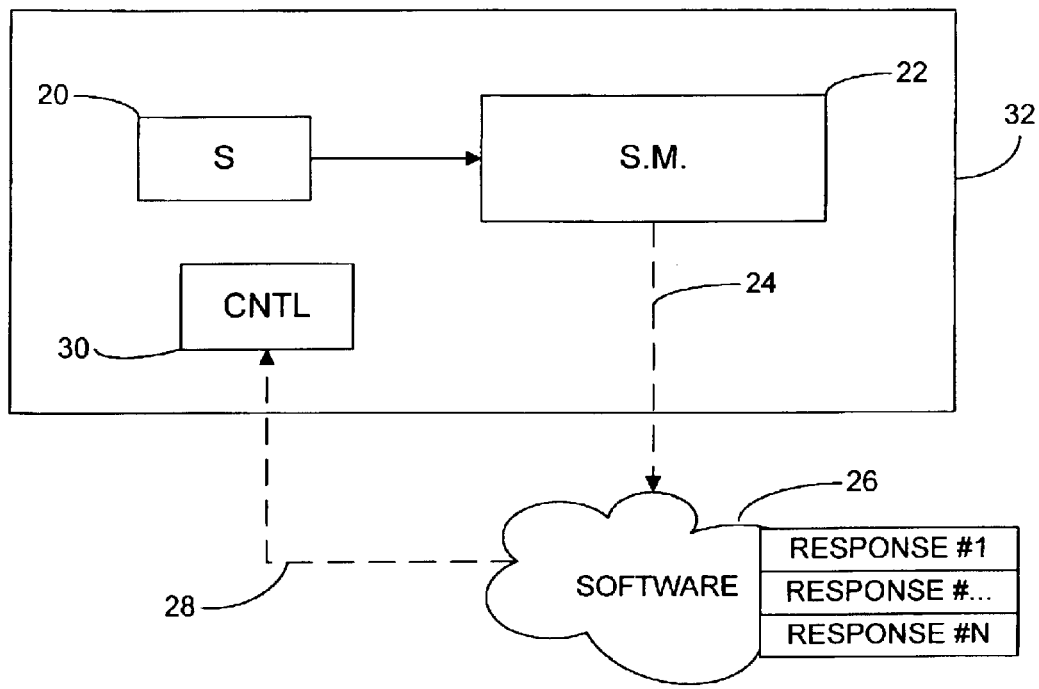
FIG. 2 is a second prior art block diagram of essential parts of an overheat compensating computer circuit.

In FIG. 2, a thermal sensor circuit 20 is connected to a thermal sensor monitoring logic block 22, which passes messages via a dash line 24 to software 26 operating on a computer. A dash line 28 is utilized to transmit control messages to a control block 30 in the computer. The dash line is used to illustrate that the time for the communication process over the dash line is much longer than the solid line connections within the hardware of the computer. As will be noted, the software 26 may provide a plurality of responses from which one may be selected and utilized in controlling the computer hardware for reducing overheat temperatures sensed by sensor circuit 20. Due to time involved in messages passing over the links 24 and 28 and the time required for the software to make a selection, the circuitry could overheat to an extent that the selected action is no longer appropriate. As before, a line 32 enclosing a portion of this FIGURE represents the hardware portion of the computer.

In FIG. 3, a thermal sensor circuit 40 is directly connected to a thermal sensor monitoring logic block 42. Block 42 has direct access to response storage 44, which may comprise part of block 42 or may be separate from block 42 but hardware connected. The block 42 is also connected directly to a set of controls 46 of the computer. Software is represented by an area 48 and messages are sent from software 48 to the sensor monitoring logic 42 via a dash line 50 at the start of an application program and at other times as necessary. Three dots between block 40 and a substantially identical sensor block 52 are used to illustrate that many different portions of an entire integrated circuit may be temperature sensed by a plurality of thermal sensors, each of which are supplying temperature data to the monitor logic 42. An enclosing block 54 is used to define the hardware as opposed to the software 48.

In FIG. 4, a heavy line or bar labeled 60 represents a temperature graph with readings of 60, 80, 100, 120 and 140 degrees centigrade to the left of the bar. To the right of temperature indicator 60 are threshold temperature (TT) level indications TT Lv1, TT Lv2 and TT Lv3. To the right of the temperature level indications, there are three action levels labeled Lv1, Lv2 and Lv3 that may be taken at corresponding temperature levels. As illustrated, the control block 46 would typically take an action Lv2 that will affect software operation when a given sensor 40 exceeds temperature TT Lv2 when the temperature is rising. In accordance with the built-in hardware based responses or as modified by the running application program(s), a different action will be taken when the temperature is falling and becomes less than temperature TT Lv2. Depending upon the design of the hardware, the action defined within 44 could be different for each sensor for each temperature exceeded or, alternatively, the action may be the same for all overheat conditions sensed.

In FIG. 5, an action list provides a non-exclusive example listed indication of 10 different potential actions that may be stored in storage 44 of the monitoring logic 42. As illustrated, only three actions are available, both in FIG. 3 and in the potential listed actions of FIG. 4. However, the number of available actions is a function of the hardware design. An example of responses set by the software might be that when the temperature exceeds TT Lv2, the clock frequency will be lowered, as set forth in item 2. If this action results in a drop in temperature, the normal clock frequency might be resumed, as set forth in item 7, when the temperature falls below TT Lv1. On the other hand, if the temperature continues to rise such that it exceeds TT Lv3, the OS system might be interrupted, as set forth in item 1. If the program uses threads, an action such as item 5 may be employed instead of or in addition to changing the clock frequency.

Figure 6:
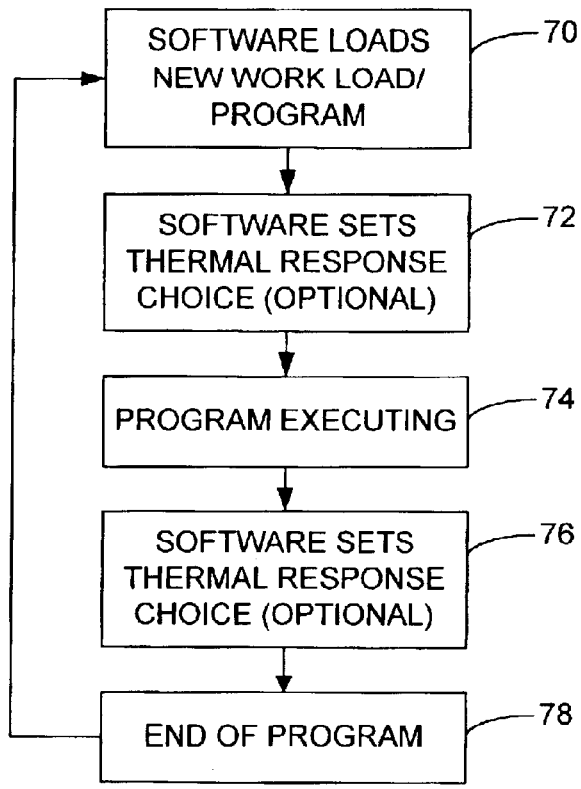
FIG. 6 is a flowchart depicting, in high-level format, the operation of the present invention relative software.
Figure 7:
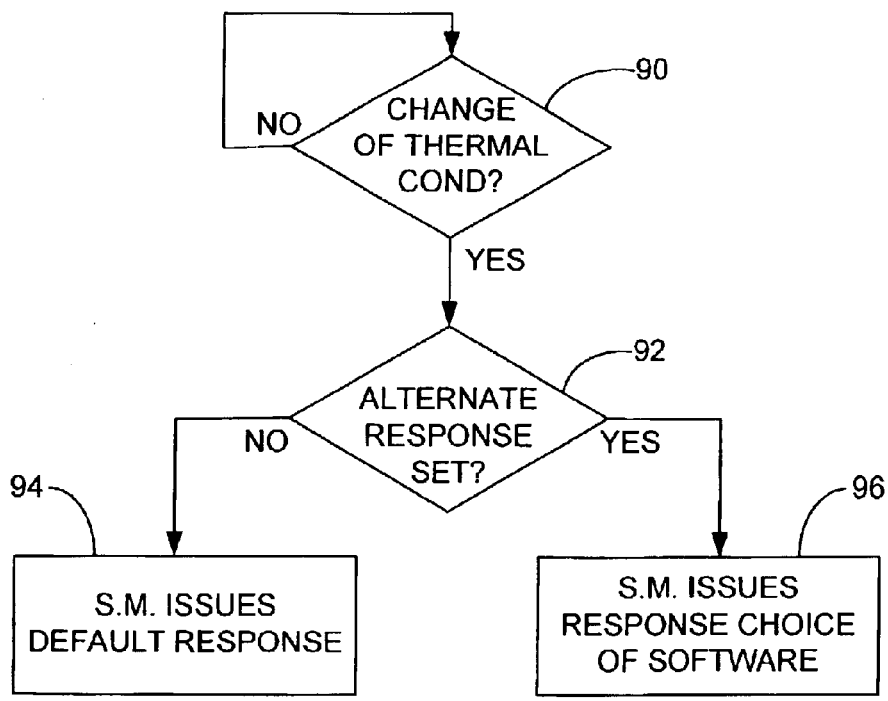
FIG. 7 is a flowchart indicative of the hardware operations of the present invention.

The flowchart of FIG. 6 represents only the steps that may optionally be taken by application software in modifying the actions taken by the hardware monitoring logic. The software steps may be imbedded with the running application program or alternatively can be run as an auxiliary program running in conjunction with and called by the main program. A block 70 represents the action of a new application program being loaded into the computer for operation thereon. The next step, which is optional with the software programmer, as shown in block 72, has software modifying the default responses of list 44 of the monitoring logic 42. The application program then executes as shown by block 74. As indicated in a block 76, the running application software may alter the response choice at any time. Although, not shown specifically, the program can modify the response list many times during the total run of the program being executed. Such multiple modifications would be unusual unless the application program was very long and/or complicated in execution.

The flow of the hardware-based logic shows the thermal sensors being checked by a decision block 90. While a separate thermal monitor may be used for each thermal sensor, a more typical situation would be for a thermal monitor to check the temperature of a plurality of sensors on a multiplexed basis. If any change is noted from one temperature indicated level to another, such as from less than TT Lv2 to greater than TT Lv2, a decision block 92 will determine if the default responses have been modified by the running software. If not, the default response will be followed as set forth in block 94. If there has been a modification, the response suggested by the running application software will be followed as set forth in a block 96. Once this action is taken, the hardware logic will check the next sensor, such as one of those between 40 and 52, to determine if its temperature has altered since the last check.

An example of how dynamic response alteration would be useful could be as follows. For the purpose of this explanation, it may be assumed that the example is directed to multiple programs running on a single PU. The operating system of this PU may use time slicing between two, or more, running applications, such as programs #1 and #2. In this example, each program runs on this PU for 2 ms, then switches to the next, or other, one. It may be further assumed that program #1 is real-time, and program #2, and others, is not. In other words, program #2, and/or others, may be considered to be a background or less important program(s). The temperature control software in such a situation of a TT Lv2 temperature sensed might set the response for a thermal event while P1 is running as "do nothing," while the response for P2, and other background programs, may be set as "pause" or "halt." Thus the circuitry would only be active one-half, or less, of the time. This reduced operation of the overheated circuitry may be entirely sufficient to drop the temperature of the affected circuitry down below the level of TT Lv2, thereby allowing background program(s) to proceed with their operation. If the pause action includes shutting down the clocks and removing power to the affected circuit during the pause operation, the time for a significant reduction in temperature will be even further reduced.

In summary, the present invention comprises having direct hardware control of temperature reducing actions affecting circuitry of an integrated circuit to quickly provide a temperature reducing response. This is accomplished by having the hardware have default responses to over temperature conditions, which, at the time of loading application software to be run on the PU, may be stored as a preferred alternate to the default condition response actions of the thermal sensor monitoring logic. The information stored may be for any sensed portion of a chip that is determined to be overheated or may be different for each different sensor or some intermediate combination. The response actions may be altered by the temperature control software dynamically during the running of a loaded software program in response to other sensors or due to a change in the operating environment, such as running additional programs simultaneous with the first loaded program.

It should be noted that the portions of circuitry sensed may be an entire integrated circuit as well as smaller portions. The smaller portions may be described as islands of circuitry and may comprise action specific logic, such as a floating point math unit. In the case of a multiprocessor chip, these islands may again comprise an entire PU.

Although the invention has been described with reference to a specific embodiment, the description is not meant to be construed in a limiting sense. Various modifications of the disclosed embodiment, as well as alternative embodiments of the invention, will become apparent to persons skilled in the art upon reference to the description of the invention. It is therefore contemplated that the claims will cover any such modifications or embodiments that fall within the true scope and spirit of the invention.

What is claimed is:

1. A method of reducing hot spot temperatures in specific logic defined circuitry islands of an integrated circuit chip, comprising:

providing a temperature sensor for each of a plurality of logically definable islands of circuitry on a chip;

incorporating an action list of possible responses to given hot spot temperatures in software to be run on a PU (processing unit) utilizing said chip;

storing the selected response(s) in hardware for direct access by action selecting logic circuitry;

selecting at least one of the possible responses to be used as a function of a detected specific island hot spot temperature; and activating an action in accordance with a selected response.

2. A method for providing a programmable response for thermal sensor implementation on a chip substrate defining a plurality of islands, comprising:

generating an action list of different possible responses associated with said islands to hot spots on said substrate;

storing the action list in hardware for direct access;

detecting one of said hot spots and parameters associated with said detected one of said hot spots;

selecting one of said possible responses from said action list functionally related to said parameters; and activating said response in response to said selecting.

3. A method of responding to integrated chip hot spots in computer apparatus, comprising:

incorporating at least one thermal sensor in computer circuitry likely to overheat;

monitoring said at least one thermal sensor whereby at least one default response stored in hardware is provided upon detection of a thermal sensor traversing a predetermined temperature; and accepting inputs from application software to modify said at least one default response.

4. The method of claim 3, comprising in addition a list of default responses that are to be taken for each of a plurality of predetermined temperatures traversed by said at least one thermal sensor.

5. The method of claim 4, comprising in addition means for dynamically modifying any part of a list of default responses that are to be taken for each of a plurality of predetermined temperatures traversed by said at least one thermal sensor via inputs from running application software.

6. Computer apparatus, comprising:

at least one thermal sensor circuit;

thermal sensor hardware based monitoring logic circuit including response action storage means;

control means operable to alter computer operational attributes in accordance with instructions from said thermal sensor monitoring logic circuit; and code imbedded in software being run on the computer which may dynamically update potential response actions in said response action storage means of said thermal sensor monitoring logic circuit in accordance with requirements of the computer program being run.

7. A method of modifying computer hardware operating parameters as a function of sensed chip operating temperatures where the computer includes at least one thermal sensor and associated temperature monitoring hardware logic having response action storage capability, comprising:

generating a hardware based default action list of responses to be taken by the monitoring hardware with detected sensor temperature changes, wherein the default action list is at least stored in the monitoring hardware; and changing the action taken by the hardware logic as a function of running computer software inputs to said hardware logic.

8. Computer apparatus, comprising:

at least one thermal sensor circuit; and thermal sensor monitoring logic circuit including software modifiable default response action storage means, wherein the thermal sensor monitoring logic is at least configured to select a potential response from an action list of potential responses stored in the software modifiable response action storage means.

9. Apparatus as claimed in claim 8, comprising, in addition;

means, responsive to software supplied inputs, operable to modify at least one of the default responses to be taken by said monitoring logic circuit.

10. A computer program product for providing a programmable response for thermal sensor implementation on a chip substrate defining a plurality of islands, the computer program product having a medium with a computer program embodied thereon, the computer program comprising:

computer code for generating an action list of different possible responses associated with said islands to hot spots on said substrate; and computer code for replacing default hardwired responses in a software modifiable response action storage means with said action list of defined responses in the software modifiable response action storage means.

11. A computer program product for redefining a hardwired response for hot spots on a chip substrate defining a plurality of islands, the computer program product having a medium with a computer program embodied thereon, the computer program comprising computer code, imbedded in software being run on the computer, for redefining and/or dynamically updating the hardwired response actions in response action storage means of thermal sensor monitoring logic circuit in accordance with requirements of the computer program being run, wherein the computer code for redefining and/or dynamically updating at least comprises having computer code for storing an action list of potential responses in the response storage means.

12. A computer program product for redefining a hardwired default response for hot spots on a chip substrate defining a plurality of islands, the computer program product having a medium with a computer program embodied thereon, the computer program comprising computer code for changing the hardwired default action taken by hardware logic as a function of running computer software inputs to said hardware logic, wherein the computer code for changing comprises at least computer code for storing an action list of potential responses in a response storage means located in said hardware logic.

13. A computer program product for redefining a hardwired default response for hot spots on a chip substrate defining a plurality of islands, the computer program product having a medium with a computer program embodied thereon, the computer program comprising:

computer code for retrieving an action list of different possible responses associated with said islands to hot spots on said substrate from a running application program; and computer code for replacing default hardwired responses with said application program action list of defined responses, wherein the computer code for replacing comprises at least computer code for storing an action list of potential responses in a response storage means located in said hardware logic.

* * * * *